Figure 1:
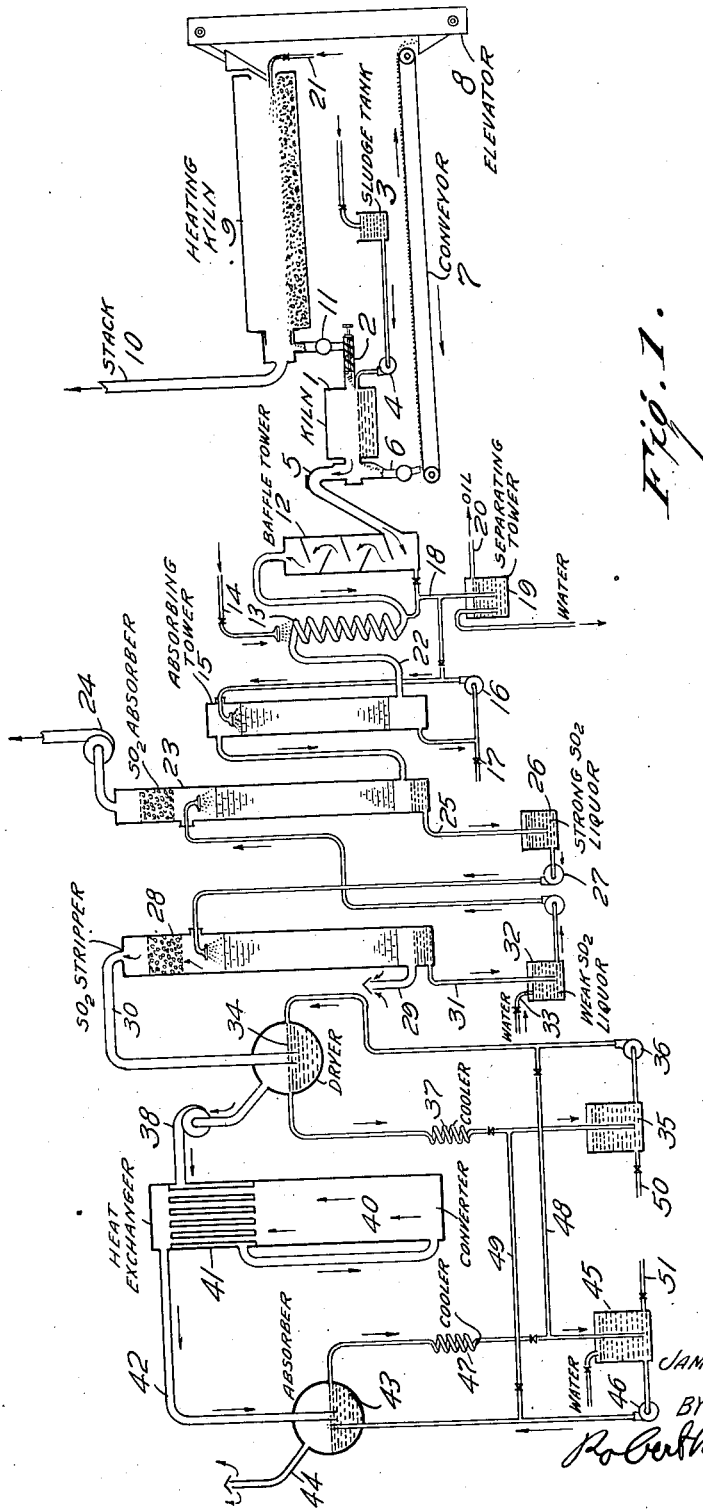

Patented Jan. 21, 1936

2,028,725

UNITED STATES PATENT OFFICE 2,028,725

PRODUCTION OF SO₂ FROM ACID SLUDGE

James M. Rumple, St. Louis, Mo., assignor to Chemical Construction Corporation, New York, N. Y., a corporation of Delaware Application December 2, 1933, Serial No. 700,758

16 Claims. (Cl. 23—177)

This invention relates to the production of $SO_2$ from acid sludges from the sulfuric acid purification of carbonaceous material, and more particularly to the production and utilization of $SO_2$ from the acid sludge from the sulfuric acid purification of petroleum hydrocarbons.

In the past many attempts have been made to decompose the acid sludge from the sulfuric acid purification of various materials, such as petroleum hydrocarbons, in order to recover a gas containing $SO_2$ which can be utilized either by reoxidizing $SO_2$ to $SO_3$ or in other ways. Because of the many difficulties involved the attempts in the past have not proven to be commercially successful until in 1931 the Hechenbleikner process was developed. This process is described and claimed in the copending application of Ingenuin Hechenbleikner, Serial No. 568,050, filed October 10, 1931, now Patent Number 1,953,225, in which acid sludge is decomposed in an internally-fired rotary kiln. This process produced for the first time in a commercially useful manner an $SO_2$ gas free from $H_2S$ and $SO_3$. The gas produced in the Hechenbleikner process contains, of course, water vapor and hydrocarbons and it is only of moderately high strength since it is diluted with the combustion gases used in heating the retort. The gas is then cooled to condense out water vapors and some of the condensable hydrocarbons. The remaining hydrocarbons have to be removed if the gas is to be used for producing sulfuric acid by the contact process because of acid mist troubles which result when hydrocarbons are burned in the converter with the formation of water. In order to effect this removal, hydrocarbon combustion furnaces have been included in the circuit as described in the copending application of Ingenuin Hechenbleikner and William Mast, Serial No. 693,136, filed October 11, 1933. This modified process results in a very pure $SO_2$ gas but since the combustion of hydrocarbons requires additional air the gases are further diluted.

It has been found that these Hechenbleikner processes operate most effectively on sludges having a low oil content. However, even with low oil sludges the $SO_2$ gas after purification is not of great strength. When high oil sludges are treated by the Hechenbleikner processes the amount of hydrocarbons which are not condensed is relatively high because an oil mist is formed and this mist is not completely condensed so that a considerable portion of the hydrocarbons which have a boiling point above the condensation temperature remain in the gas stream in the form of fine mist particles. This has made it difficult to utilize the Hechenbleikner processes on high oil sludges without further modifications.

One modified process is described and claimed in the copending application of Frank J. Bartholomew, Serial No. 679,023, filed July 5, 1933. According to this modification of the Hechenbleikner process high oil sludges are subjected to preliminary distillation or stripping in stills which results in a considerable removal of hydrocarbons, the residual sludge being of about the same composition as low oil sludges which can be effectively used in the Hechenbleikner processes. This combined process, however, requires additional apparatus and the character of the residual sludge will, of course, vary with variations in the type of sludge fed.

The problem of dilution has also been attacked by recirculation of the heating gases as described and claimed in the copending applications of Gilchrist and Rumple, Serial No. 701,138 filed December 6, 1933 and Rumple Serial No. 701,137 filed December 6, 1933. In these processes the gases from the sludge kiln are recirculated either through the primary combustion furnace or in the Rumple process through heating stoves or heat exchangers. These processes result in the production of a relatively concentrated $SO_2$ gas and obviate to a considerable extent the difficulties encountered in handling high oil sludges.

They are, however, more difficult to operate and in the case of Rumple care must be taken to prevent deposition of solids in the heating stoves or heat exchangers. These processes also require somewhat more complicated equipment than in a straight Hechenbleikner process and they repair just as large a decomposition kiln which in the case of a large plant may be up to 35 or more feet in length.

According to the present invention, the difficulties involved in handling high oil sludges, or in fact sludges of any composition, are entirely eliminated. A gas of great strength is produced and the apparatus is simpler and of greater capacity than in the original Hechenbleikner process. The present invention depends on the use of non-gaseous heating media in an internally heated kiln. These non-gaseous heating media may be of the most varied kind, such as heated metal balls, heated sand, hot molten metals, such as molten lead, molten salts and the like. The heating medium and sludge are caused to flow into a kiln or other closed vessel and to mix intimately, the heating taking place very rapidly with a resulting enormous capacity from relatively small apparatus. The gas produced is, of course, of high strength as there are no combustion gases diluting it. Gases up to 85 and even in some cases 90% SO₂ content are readily obtained.

The high strength gases permit a very complete removal of condensable hydrocarbons by cooling the gas stream which is not possible with less concentrated gases where the large amount of diluting gas tends to cause the formation of an oil mist which does not condense out in ordinary condensers and which accordingly raises the concentration of hydrocarbons in the gases. Because of the very high strength of SO₂ gases the problem of removing hydrocarbons is greatly simplified as almost any method may be used such as burning, as described in the Hechenbleikner and Mast application, diluting with gases from a sulfur or ore burner as described in application of C. B. Clark, Serial No. 671,647, filed May 18, 1933, etc. It is also possible in the case of certain sludges which produce a relatively small amount of uncondensable hydrocarbons, to eliminate purification altogether because the amount is too low to cause any difficulty. Thus, the chief problem connected with the utilization of SO₂ gases from acid sludge or similar material, is avoided and simple and economical methods of purification can be employed without unduly diluting the purified gases.

The great strength of the SO₂ gas obtained by the present process likewise permits the utilization of the SO₂ gases in processes for which the more dilute gases obtained by the Hechenbleikner processes would be unsuitable or would be less suitable. Thus, for example, if it is desired to reduce the SO₂ gases to sulfur, as described in the copending application of C. B. Clark, Serial No. 675,973, filed June 15, 1933, the greater strength of gas obtainable by the present invention reduces the size of apparatus, particularly the sulfur collectors and permits higher recoveries of sulfur. In the Clark sulfur process described in the application above referred to, the presence of hydrocarbons within limits is not a detriment, but on the contrary an advantage as it reduces the amount of fuel necessary. While it is an advantage of the present process that hydrocarbons can be removed to a very large extent by simple condensation, it should be appreciated that it is not necessary to run the process so as to remove a maximum of hydrocarbons. On the contrary, by keeping the condensers at a suitably elevated temperature, it is possible to retain a considerable amount of hydrocarbons which is advantageous in the production of sulfur.

While the stronger gas and, when desired, lower concentration of hydrocarbons obtainable by the present process, is of great advantage when used with the normal types of purification, it is a further advantage of the present process that other methods of purification can be effectively used with the present process which would not be suitable with dilute gases. Thus, for example, the strong SO₂ gas obtained by the present process can be readily absorbed in water to form an SO₂ liquor of quite reasonable concentration, for example, up to 5% or even more. From this liquor of course the SO₂ can be removed in a chemically pure state by heating with steam or when the SO₂ gas is to be used in the contact sulfuric acid process, the most usual field of utilization, the SO₂ can be stripped from the liquor by blowing air through it to form an SO₂ gas having the required concentration of SO₂ and oxygen for optimum results in the contact sulfuric acid process. This gas, which is entirely pure except for the presence of some moisture, requires only drying before passing through the converter. A gas of such high purity is very advantageous. In the first place it can be used at existing platinum contact acid plants for the gas is of course free of catalyst poisons, and even when employed in conjunction with modern vanadium contact acid plants which are not poisoned, acid of extraordinarily high purity is obtained; a difficult problem in the ordinary Hechenbleikner process because the presence of hydrocarbons in the gases passing through the drying tower tend to contaminate the acid and of course any other acid soluble impurities contained in the gases will likewise act as contaminants. I prefer, therefore, to use the absorption and stripping method for purifying the gases after removal of condensable water and hydrocarbons and in combination with this method of purification my process shows its greatest effectiveness, but it should be understood that the process is in no sense limited to any particular method of purification nor, for that matter, to the utilization as of the SO₂ gas in the contact sulfuric acid process.

The heating media may be of three general types, molten metals, solids of relatively large particle size such as iron or steel balls, and finely divided solids such as sand. When molten metals or other molten materials having a sufficiently high boiling point to be useful as heating media, are employed the coke which is formed by the decomposition of acid sludge and which has the same desirable characteristics as the coke produced in the straight Hechenbleikner process is easily separated from the heating medium. This permits recovery of the coke for use as fuel and in many installations where such coke is salable, constitutes an advantageous modification. When finely divided solids such as hot sand, are employed, the coke formed contains the solids intimately admixed with it. It is possible in such cases to remove the coke by suitable means, but when hot sand is employed it is generally preferable not to remove the coke from the sand but to burn the coke in contact with the sand in order to heat it for further use in the decomposition of sludge. Such a process eliminates screening or methods of separation and permits a very simple method of heating the sand. It has, however, the disadvantage of consuming all of the coke which in many cases in salable and which usually is present in an amount greater than that actually required to heat the sand. The respective advantages and disadvantages of these two methods depend in considerable measure on the economic conditions and on the plant installation. In every case the skilled engineer will adopt the modification best suited for the particular plant and it is an advantage of the present invention that it is applicable to a wide number of conditions and the best arrangement can, in any case, be chosen.

Figure 2:
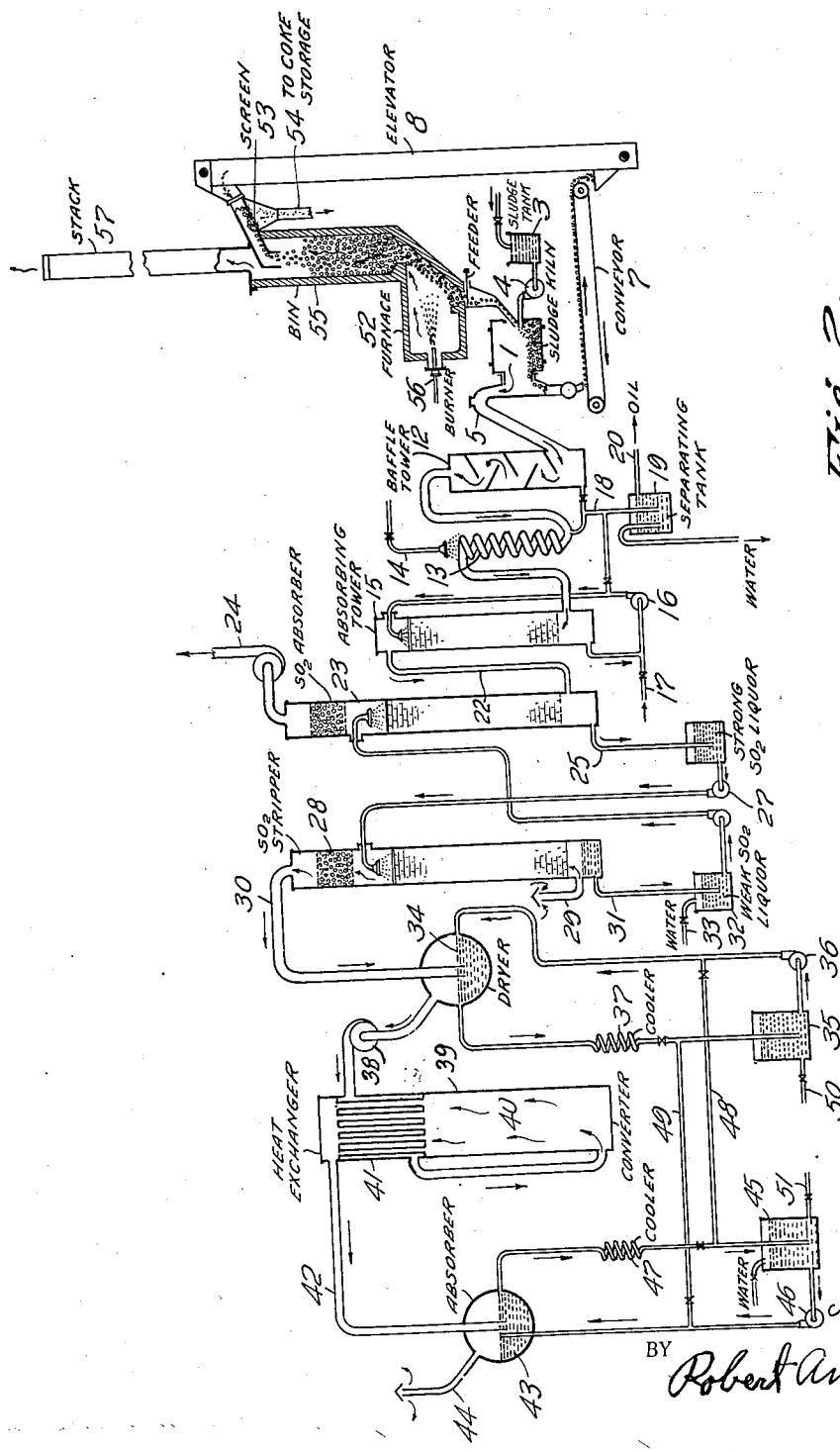

In the drawings Fig. 1 is a diagrammatic elevation partly in section of an installation utilizing hot sand as a heating medium; and Fig. 2 is a diagrammatic elevation partly in section of an installation utilizing heated steel balls as the heating medium.

In the drawings in Fig. 1 the sludge decomposition kiln is shown at 1, it being noted that the kiln is very much smaller than a kiln of comparable capacity in a straight Hechenbleikner process. In fact the kiln may in some cases be less than one-quarter as long as is needed in the standard Hechenbleikner process. Hot sand at about 1500° F. is fed into the kiln by means of the screw 2 and at the same time sludge is pumped from the tank 3 by means of the pump 4 into the kiln where it mixes with hot sand as the kiln revolves. If desired, the sludge inlet pipe may be water cooled to prevent plugging because of coke formation in the pipe. The proportion of sand to sludge may vary with different sludges. I find that very satisfactory results are obtained when the proportion is from 3 of sand to 1 of sludge to 4 of sand to 1 of sludge, but other proportions may be used. The decomposition of the sludge takes place very rapidly and a fine mixture of sand and coke is produced which is discharged at about 400° F. through the coke discharge 6. The gases evolved pass out through gas outlet 5. The sand and coke mixture falls on to a conveyor 7 on which it is transported to elevator 8 which raises it and discharges into heating kiln 9 where the coke is ignited by the pilot flame 21 and burns. The combustion gases pass up the stack 10. The combustion of the coke intimately mixed with the sand heats the latter to red heat and the sand is then discharged through the valve 11 into the screw feed where it flows into the kiln. The screw does not extend to the opening into the kiln so that sand piles up and acts as a gas seal. The hot gases passing out through the stack 10 may of course be utilized in any suitable manner such as by means of a waste heat boiler (not shown)

The gases evolved from the decomposition of the sludge pass through a baffled air condenser 12, thence through a condenser coil 13, cooled by a spray of water from the spray 14, and finally through a scrubbing tower 15 in which a constant circulation of water is effected by the pump 16. Fresh water is introduced into the system through the valved pipe 17. In the condensers and scrubbing tower hydrocarbons are very effectively condensed since the gases are undiluted by combustion gases and accordingly there is little or no oil mist formation. The water, which of course is saturated with $SO_2$, and the condensed oils flow out from the bottom of the two condensers through the pipe 18 into the separator 19 where the oil is drawn off through the pipe 20 and the water containing dissolved $SO_2$ is continuously removed through a syphon pipe and, if desired, the $SO_2$ content may be recovered by stripping, preferably by means of heat. $SO_2$ solution and oil which is formed in the scrubber 15, are continuously drawn off from the circuit through a valved pipe which connects to the pipe 18.

The scrubbed gases leaving the tower 15 through the pipe 22, flow up through an absorbing tower 23 counter to a spray of cold water or dilute $SO_2$ solution. Practically all of the $SO_2$ is absorbed, the small residue of fixed gases being sucked off from the top of the tower by the blower 24. The $SO_2$ liquor thus formed flows out of the bottom of the tower through the pipe 25 into an $SO_2$ liquor tank 26. From the tank 26 the $SO_2$ liquor is pumped by the pump 27 into the top of a stripping tower 28 where it flows down over packing in countercurrent to a stream of air introduced into the bottom of the tower through the air inlet 29. This air strips most of the $SO_2$ out of the liquor and passes out at the top of the tower through the pipe 30. The stripped liquor flows out of the bottom of the tower through the pipe 31 into the weak liquor tank 32 where, if desired, make-up water may be introduced through the valved pipe 33. Make-up water is required as the amount of water vapor carried off by the blower 24 and by the stream of air in the stripping tower, is greater than the amount of moisture in the gases leaving the scrubber 15.

The $SO_2$ gas which is mixed with the proper amount of air for conversion into $SO_3$ by the contact process, leaves the tower 28 in a highly purified form but containing, of course, a considerable amount of moisture. This moisture is removed in the dryer 34 where the gas bubbles through a strong sulfuric acid which may be for instance, of 93% strength. The acid is circulated through the dryer from the acid tank 35 by means of the pump 36, a cooler 37 being provided to maintain the temperature at the desired point so as to ensure efficient drying. The dehydrated gases are then sucked by the blower 38 and forced through the converter 39 which consists of a catalyst containing portion 40 and a heat exchanger 41. The converted gases after leaving the heat exchanger through pipe 42 are then absorbed in an absorber 43 in the usual manner, the waste gases passing out through a stack 44. The circulation of acid which may be of 98% or greater strength, is from the tank 45 through the pump 46, absorber 43, and back through the cooler 47. The absorption of $SO_3$ in the absorber 43 requires the addition of water to the system. This is normally effected by causing a portion of the weak acid from the dryer circuit to flow into the absorber circuit through the valved pipe 48. Similarly, a portion of the strong acid from the absorber circuit can be caused to flow back into the dryer circuit through the valved pipe 49. Valved draw-off pipes 50 and 51 serve to draw off acid from the tanks 35 and 45 respectively, depending on whether the system is to produce 93% acid or stronger acid. If oleum is to be produced usually two absorbers are arranged in series.

It should be understood that the particular method of purifying $SO_2$ gases by means of an absorber and stripper, does not limit the invention. It is a very effective method of obtaining $SO_2$ gas of high purity for the contact process, but any other method may be used which proves desirable under the particular conditions of a given installation. Thus, for example, if it is desired, the small amount of hydrocarbons remaining in the gas leaving the scrubber 15 may be burned out as described in Hechenbleikner and Mast's application above referred to. Of course, the strength of the $SO_2$ gas is so great that no material dilution troubles arise.

The converter, absorber and drying system is shown in purely conventional form and it should be understood that the invention may be used with any suitable design of converter, dryer or absorption equipment.

The modification in Fig. 2 utilizes metal balls instead of hot sand, otherwise the apparatus is the same and similar parts bear the same reference numerals. The hot iron balls from the ball heating furnace 52 are caused to flow into the sludge kiln 1, where they mix with the acid sludge introduced from the sludge tank 3 in the same manner as in Fig. 1. However, the time of contact between sludge and balls should normally be somewhat greater, which may be obtained either by using a longer kiln or by cutting down the rate of feed. The reason for the slightly longer time of contact lies in the fact that the balls do not give off their heat instantaneously and a finite period of time is required for the balls and the sludge residue to come to a uniform temperature.

The coke and balls fall on to the conveyor 7 and are then lifted by the elevator 8 from which they are discharged on to the screen 53 through which the finely divided coke passes, being removed through coke discharge pipe 54. The balls freed from coke fall into the bin 55 where they gradually sink in countercurrent to the combustion gases from the burner 56 in the furnace 52. The balls are therefore preheated before they actually enter the furnace and contact with the flame. The combustion gases, after passing through the balls, leave through stack 57.

The gas evolved in the kiln is purified in precisely the same manner as in Fig. 1 and is of substantially the same composition.

The amount of balls required will vary between 3 and 4 times the weight of sludge treated and since the amount of coke produced contains more heat units than is usually required, a very marked saving in fuel is obtained over the process shown in Fig. 1. Where coke is readily saleable, this is an important economy and for this reason I prefer to use this modification of the invention although it should be understood that in its broader aspects the invention includes either method of reheating the heat transferring medium. In general the temperatures of hot sand or hot metal balls will be approximately the same as the total heat to be transmitted to the sludge depends on the temperature of the heating medium where the weights are the same. The losses from abrasion of the metal balls are very slight and because of the fact that these balls absorb the heat of the burner very effectively, there is not as great a temperature evolved in contact with the furnace walls as may be the case when sand and coke are burned as in Fig. 1, especially where the amount of coke is greater than that needed to supply the requisite amount of heat.

In both the figures of the drawings the $SO_2$ gas is shown as utilized in the contact sulfuric acid process. This constitutes the most important commercial utilization in most cases, but it should be understood that any other utilization of the $SO_2$ is included, such as the production of sulfur as described above, the production of liquid $SO_2$ where there is a market for the same, the production of sulfites and bisulfites, the oxidation of $SO_2$ in chamber plants and the like. In every case the great strength of the gas permits utilizing equipment at maximum efficiency and the full advantages of having a high concentration of $SO_2$ are enjoyed irrespective of what particular method of utilization of the gas is employed.

The drawings are purely diagrammatic in nature since the exact mechanical construction of the apparatus used in the process does not form any part of the present invention and on the contrary any suitable types of apparatus may be used. Likewise structural details have been omitted for the sake of clearness but it should be understood that in an actual plant the skilled engineer will use well known apparatus with all of the accessories which are necessary to its operation. Thus, for example, insulation of kiln, furnace and other units is omitted for the sake of simplicity, but of course in an actual plant, units operated at high temperatures will be insulated in the usual manner. Similarly the converter is shown in purely diagrammatic form and without any accessories.

The present invention has been described particularly in conjunction with the treatment of sulfuric acid sludge from the purification of petroleum hydrocarbons. Naturally, of course, this is the largest commercial field, but the invention is equally applicable to the treatment of sludges obtained by the sulfuric acid purification of other carbonaceous materials, such as, for example, the purification of coal tar fractions and the like. The invention is also applicable to the treatment of other $SO_4$ containing materials which can be thermally decomposed to yield gases containing $SO_2$.

What I claim is:

1. A method of decomposing acid sludge from the sulfuric acid purification of hydro-carbonaceous material which comprises thoroughly mixing the sludge with a stream of a highly heated, non-gaseous heating medium, the temperature and the amount of the heating medium being such as to decompose the sludge to a carbonaceous residue with evolution of $SO_2$ free from $H_2S$, continuously removing the $SO_2$ gas evolved from the reaction zone and removing the carbonaceous residue and the heating medium.

2. A method of decomposing acid sludge from the sulfuric acid purification of hydro-carbonaceous material which comprises thoroughly mixing the sludge with a stream of highly heated solids, the temperature and the amount of the solids being such as to decompose the sludge to a carbonaceous residue with evolution of $SO_2$ free from $H_2S$, continuously removing the $SO_2$ gas evolved from the reaction zone and removing the carbonaceous residue and the solids.

3. A method of decomposing acid sludge from the sulfuric acid purification of hydro-carbonaceous material, which comprises thoroughly mixing the sludge with a stream of highly heated, non-gaseous heating medium, the temperature and the amount of the heating medium being such as to decompose the sludge to a carbonaceous residue with evolution of $SO_2$ free from $H_2S$, continuously removing the $SO_2$ gas evolved from the reaction zone and removing the carbonaceous residue and the heating medium, separating the carbonaceous residue from the heating medium and reusing the heating medium after reheating.

4. A method of decomposing acid sludge from the sulfuric acid purification of hydro-carbonaceous material, which comprises thoroughly mixing the sludge with a stream of highly heated solids, the temperature and the amount of the solids being such as to decompose the sludge to a carbonaceous residue with evolution of $SO_2$ free from $H_2S$, continuously removing the $SO_2$ gas evolved from the reaction zone and removing the carbonaceous residue from the solids, separating the carbonaceous residue from the solids, and reheating and reusing the solids.

5. A method according to claim 1 in which the $SO_2$ gas evolved is cooled to condense out water and condensable hydrocarbons, and the $SO_2$ gas is then adjusted to a composition containing sufficient oxygen for the contact sulfuric acid process and an amount of hydrocarbons giving a hydrogen content less than 3 mg. per cubic foot and passing the gas thus adjusted at reaction temperature over a contact sulfuric acid catalyst.

6. A method according to claim 2 in which the $SO_2$ gas evolved is cooled to condense out water and condensable hydrocarbons, and the $SO_2$ gas is then adjusted to a composition containing sufficient oxygen for the contact sulfuric acid process and an amount of hydrocarbons giving a hydrogen content less than 3 mg. per cubic foot and passing the gas thus adjusted at reaction temperature over a contact sulfuric acid catalyst.

7. A method of decomposing acid sludge from the sulfuric acid purification of hydro-carbonaceous material which comprises thoroughly mixing the sludge with a stream of highly heated solids, the temperature and the amount of solids being such as to decompose the sludge to a carbonaceous residue with evolution of $SO_2$ free from $H_2S$, continuously removing the $SO_2$ gas evolved from the reaction zone and removing the carbonaceous residue and the solids, cooling the $SO_2$ gas evolved to condense out water and condensable hydrocarbons, contacting the gas with cold water having a sufficiently small $SO_2$ content so that substantially all of the $SO_2$ of the gas is absorbed, and removing the $SO_2$ from the liquor thus formed.

8. A method of decomposing acid sludge from the sulfuric acid purification of hydro-carbonaceous material which comprises thoroughly mixing the sludge with a stream of highly heated solids, the temperature and the amount of solids being such as to decompose the sludge to a carbonaceous residue with evolution of $SO_2$ free from $H_2S$, continuously removing the $SO_2$ gas evolved from the reaction zone and removing the carbonaceous residue and the solids, cooling the $SO_2$ gas evolved to condense out water and condensable hydrocarbons, contacting the gas with cold water having a sufficiently small $SO_2$ content so that substantially all of the $SO_2$ of the gas is absorbed, stripping the $SO_2$ from the liquor thus formed by a current of air to produce an $SO_2$ gas having suitable concentration for the contact sulfuric acid process, and passing the gas thus produced at reaction temperature over a contact sulfuric acid catalyst.

9. A method according to claim 7 in which the stripped $SO_2$ liquor is used at least in part for absorbing the $SO_2$ from the original gas.

10. A method according to claim 8 in which the stripped $SO_2$ liquor is used at least in part for absorbing the $SO_2$ from the original gas.

11. A method according to claim 7 in which the coke and solids are separated and the solids are reheated and reused.

12. A method according to claim 2 in which the solids are metal balls.

13. A method according to claim 4 in which the solids are metal balls.

14. A method according to claim 7 in which the solids are metal balls.

15. A method according to claim 4 in which the heating solids and carbonaceous residue are continuously discharged from the reaction zone, are sifted to separate the carbonaceous residue from the solids and the solids are passed in countercurrent to a flow of combustion gases and then into contact with the sludge stream.

16. A method according to claim 4 in which the heating solids are metal balls and the balls and carbonaceous residue are continuously discharged from the reaction zone, are sifted to separate the carbonaceous residue from the balls, and the balls are passed in countercurrent to a flow of combustion gases and then into contact with the sludge stream.

JAMES M. RUMPLE.